United States Patent
Troitski

(10) Patent No.: US 6,417,485 B1
(45) Date of Patent: *Jul. 9, 2002

(54) METHOD AND LASER SYSTEM CONTROLLING BREAKDOWN PROCESS DEVELOPMENT AND SPACE STRUCTURE OF LASER RADIATION FOR PRODUCTION OF HIGH QUALITY LASER-INDUCED DAMAGE IMAGES

(76) Inventor: Igor Troitski, 853 Arrowhead Trail, Henderson, NV (US) 89015

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 52 days.

(21) Appl. No.: 09/583,454

(22) Filed: May 30, 2000

(51) Int. Cl.$^7$ ................................................ B23K 26/00
(52) U.S. Cl. .................................................. 219/121.69
(58) Field of Search .................. 219/121.61, 121.62, 219/121.68, 121.69, 121.85

(56) References Cited

U.S. PATENT DOCUMENTS

| | | |
|---|---|---|
| 3,715,734 A | 2/1973 | Fajans |
| 3,778,361 A | 12/1973 | Courtney-Pratt |
| 3,920,951 A | 11/1975 | Chovan et al. ............. 219/121 |
| 4,092,518 A | 5/1978 | Merard |
| 4,564,739 A | 1/1986 | Mattelin |
| 4,642,701 A | 2/1987 | Maeda et al. |
| 4,843,207 A | 6/1989 | Urbanek et al. |
| 5,206,496 A | 4/1993 | Clement et al. |
| 5,272,309 A | 12/1993 | Goruganthu et al. |
| 5,575,936 A | 11/1996 | Goldfarb |
| 5,637,244 A | 6/1997 | Erokhin |
| 5,653,900 A | * 8/1997 | Clement et al. ....... 219/121.68 |
| 5,786,560 A | 7/1998 | Tatah et al. |
| 5,886,318 A | 3/1999 | Vasiliev et al. |
| 6,087,617 A | 7/2000 | Troitski et al. .......... 219/121.6 |
| 6,333,486 B1 | * 12/2001 | Troitski ................. 219/121.69 |

FOREIGN PATENT DOCUMENTS

| | | | |
|---|---|---|---|
| EP | 0743128 A1 | 11/1996 | |
| JP | 52-39893 | 3/1977 | |
| JP | 63-171281 | * 7/1988 | ............ 219/121.68 |
| JP | 1-233086 | 9/1989 | |
| JP | 409184706 | 7/1997 | |
| RU | 321422 | 11/1970 | |
| RU | 2008288 | 2/1994 | |
| SU | 1838163 | 8/1993 | |
| WO | 96/30219 | 10/1996 | |

* cited by examiner

Primary Examiner—Samuel M. Heinrich
(74) Attorney, Agent, or Firm—Weide & Miller, Ltd.

(57) ABSTRACT

Embodiments of methods and an apparatus for creating points or areas of laser-induced damage inside a transparent material are disclosed. One or more embodiments of the invention comprise a method and system for producing etch points by control of breakdown process development. In one embodiment, at the beginning an applied laser radiation level just exceeds an energy threshold for creating a plasma condition in the material, and thereafter the energy level of the applied laser radiation is just maintain the plasma condition and is applied before the plasma condition extinguishes, but after a shock wave associated therewith has passed. Other embodiments of the invention comprise a method and a system for producing etch points by controlling a space structure of laser beam. According to the invention a laser generates a TEM$_{mn}$ radiation. The values of the integers m and n are controlled and determined so as to reproduce particular gray shades for a particular point of an image. Points or areas of laser-induced damage produced by these methods do have the traditional and undesirable star configuration. Furthermore, it is possible to control the brightness of these points without changing their size.

7 Claims, 5 Drawing Sheets

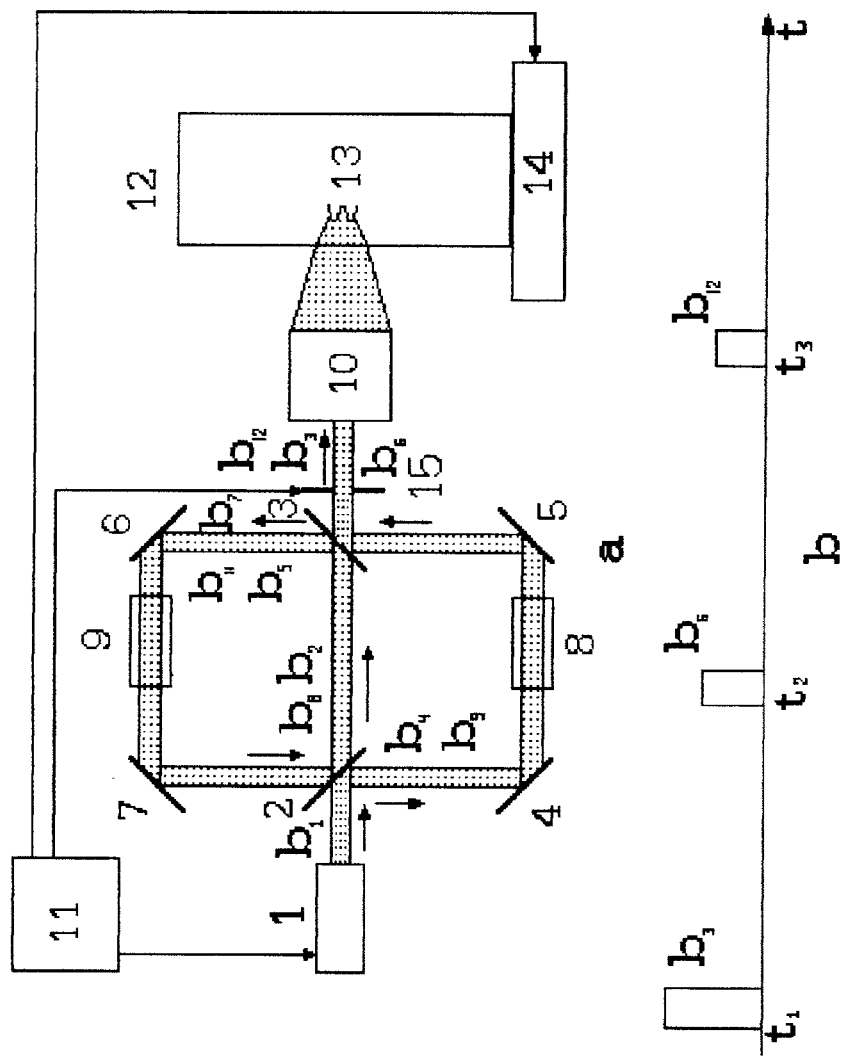

METHOD AND LASER SYSTEM CONTROLLING BREAKDOWN PROCESS DEVELOPMENT AND SPACE STRUCTURE OF LASER RADIATION FOR PRODUCTION OF HIGH QUALITY LASER-INDUCED DAMAGE IMAGES

FIELD OF THE INVENTION

The present invention relates to a method and apparatus for producing laser-induced damage points or areas in transparent objects for use in generating high quality images.

BACKGROUND OF THE INVENTION

A number of techniques for creating a variety of patterns on the surface and inside of transparent substrates using pulsed laser radiation are well known.

One publication disclosing such techniques is the Russian invention #321422 to Agadjanov et. al., published on Nov. 16, 1970 (#140454529-33). The invention concerns a method of manufacturing decorative products inside a transparent material by changing the material structure by laser radiation. As disclosed, by moving a material relative to a focused laser beam, it is possible to create a drawing inside the material.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 4,843,207 to Urbanek et al., discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He—Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev et al. discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a preprogrammed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Patent 5,886,318 to A. Vasiliev and B.Goldfarb discloses a method for laser-assisted image formation in transparent specimens which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

U.S. patent application Ser. No. 08/643,918 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

Etch points generating by all aforementioned systems and methods generally have random star forms. Consequently, an image comprising such etch points suffers from having a low quality: its brightness fluctuates and it is not possible to accurately reproduce the gray shades of the image.

The form and size of a point or area of laser-induced damage is determined by a large number of laser beam parameters. These key parameters are set forth below along with a comparison of these parameters as recommended by aforementioned Patents.

| Laser parameters determining form and size of an internal laser-induced damage of an optical transparent material when laser radiation increases threshold. | Parameters which are recommended by aforementioned patents. |
| --- | --- |
| Kind of laser | U.S. Pat. No. 5,206,496 to R. Clement et al.: "The means for creating the required high energy density beam is preferably a Nd-YAG laser . . ." U.S. Pat. No. 5,637,244 to A. Erokhin: " . . . it is recommended to use . . . solid-state Q-switched laser . . ." |
| Laser wavelength | U.S. Pat. No. 5,575,936 to B. Goldfarb: "An apparatus . . . comprising: an impulse laser for generating a laser emission having a power rating of 50 Mjoules . . ." U.S. Pat. No. 5,206,496 to R. Clement et al.: "The means for creating the required high energy density beam is preferably a Nd-YAG laser operating at a wavelength of 1064 nm." |

-continued

| Laser parameters determining form and size of an internal laser-induced damage of an optical transparent material when laser radiation increases threshold. | Parameters which are recommended by aforementioned patents. |
| --- | --- |
| Energy | U.S. Pat. No. 5,206,496 to R. Clement et al.: "In a preferred embodiment of the present invention the power density of the laser at the focus is at least $10^7$ W/cm$^2$ and . . . so that the energy density of each pulse is at least 10 J/cm$^2$ and sufficient to induce localized ionization of the material at the focus of the beam". U.S. Pat. No. 5,575,936 to B. Goldfarb: "An apparatus . . . comprising: an impulse laser for generating a laser emission having a power rating of 50 Mjoules . . ." U.S. Pat. No. 5,637,244 to A. Erokhin: To avoid this disadvantage (self-focusing) one must provide that laser radiation power be lower than self-focusing threshold . . .". Soviet patent publication 1838163 to P. V. Agrynsky et al.: Discloses a method of creating laser induced damages having different sizes by using a repetition of laser pulses. |
| Pulse duration | U.S. Pat. No. 5,206,496 to R. Clement et al: "In a preferred embodiment of the present invention . . . and the pulse duration no more than $10^{-6}$ seconds . . ." U.S. Pat. No. 5,575,936 to B. Goldfarb: "An apparatus . . . comprising: an impulse laser for generating a laser emission having a . . . pulse length of 10 nsec . . ." |
| Pulse frequency | U.S. Pat. No. 5,575,936 to B. Goldfarb: "An apparatus . . . comprising: an impulse laser for generating a laser emission having a pulse frequency of 1 Hertz." |
| Space structure of laser beam | U.S. Pat. No. 5,637,244 to A. Erokhin: "It is a TEM$_{00}$ laser that proves to be most suitable for the purpose". |
| Beam focusing | U.S. Pat. No. 5,637,244 to A. Erokhin: "Another peculiar feature of the selected laser type resides in utilizing utmost possibilities of sharp radiation beam focusing . . ." U.S. Pat. No. 5,886,318 to A. Vasiliev and Goldfarb. This patent discloses a method with "a laser beam having different angular divergence values in two mutually square planes". |
| Number of pulses | Soviet patent publication 1838163 to P. V. Agrynsky et al.: Discloses a method of creating laser-induced damages having different sizes by using a repetition of laser pulses. |

Analyzing the information it is clear that methods of all aforementioned patents are based on a laser pulse length of 10 nsec and a TEM$_{00}$ beam. This implies that during interaction of laser radiation with a material, a very large laser energy is accumulated in a small focal area, which focal area is smaller than the size of the desired damage area, for a short time and all this energy is allocated inside the focal spot very compactly (gaussoid). Consequently, a very strong shock wave due to laser-supported deflagration is driven into the solid. The shocked stress is very larger than the fracture threshold and it induces long cracks with relatively independent orientation. These cracks result in a star structure of visible damage. As stated above, such a damage structure is not well suited for use as a point in a high-quality reproduction of an image comprising multiple of the points.

SUMMARY OF THE INVENTION

The present invention has its principal task to provide a method and apparatus for creating points or areas of laser-induced damage inside a transparent material without long and large cracks so that the exterior light scattered from the damaged areas has low fluctuations.

One or more embodiments of the invention comprise a method for producing an etch point by using a long laser pulse having an energy which exceeds a breakdown threshold by a negligible amount, but having a duration sufficient to deliver total energy for accurately producing a laser-induced damage point having a particular size and gray shade (i.e. the brightness of the point).

One or more embodiments of the invention comprise a method of producing an etch point by using a laser pulse of a specific form so that a plasma state or condition is generated at the beginning of a pulse and so that the plasma state is thereafter only maintained.

Other embodiments of the invention comprise a method and a system for producing an etch point by controlling material breakdown process development. According to the invention, at the beginning of the process, laser radiation first exceeds an energy threshold by a negligible margin so as to create a plasma condition, and thereafter a smaller level of energy is applied to maintain the plasma state. In this embodiment, subsequent rations of energy delivered, with each following energy ration being at lower/smaller levels sufficient to maintain the plasma state, and applied after a shock wave associated with the plasma generating event has passed.

Other embodiments of the invention comprise a method and a system for producing etch points by controlling a space structure of an applied laser beam. According to the invention, a laser generating light beam has a specific configuration of the optical cavity so as to generate $TEM_{mn}$ radiation. The product of the integers m and n associated with the $TEM_{mn}$ mode of this radiation are equal to a number of light intensity maximums allocated inside the focal area having a maximum energy sufficient to produce a breakdown of the material. The number of light intensity maximums is controlled and determined so as to reproduce particular desired brightness and gray shades of an image.

Further objects, features, and advantages of the present invention over the prior art will become apparent from the detailed description of the drawings which follows, when considered with the attached figures.

DESCRIPTION OF THE DRAWINGS

FIG. 5(a) is an exemplary block-diagram of a laser etching system of the invention for production of high quality laser-induced damage images by controlling breakdown process development; and 5(b) is a timetable of interaction moment of different beams.

DETAILED DESCRIPTION OF THE INVENTION

Figure 1:
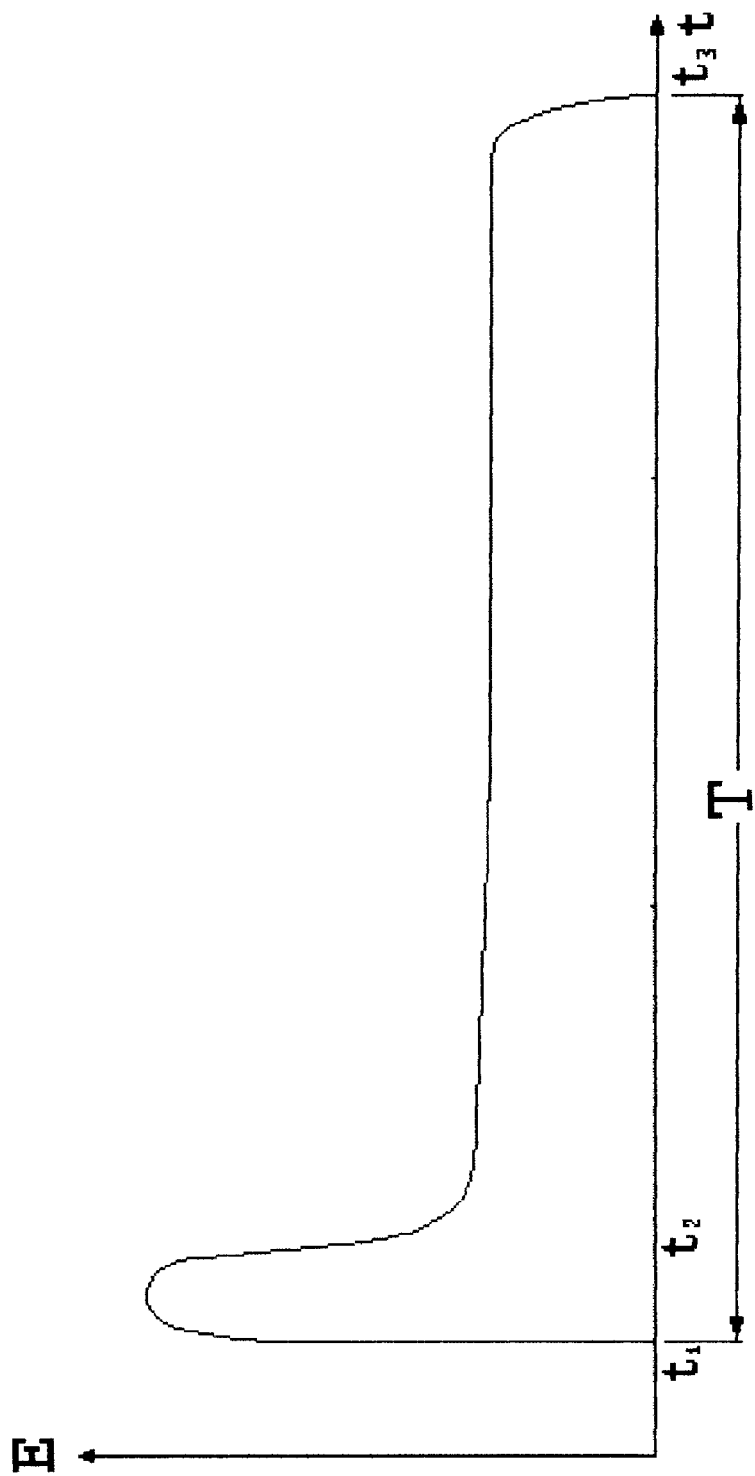
FIG. 1 shows a specific form of a laser pulse for creation of laser-induced damages without long cracks in accordance with the invention.

The invention comprises methods and apparatus for generating points or areas of laser induced-damage inside an optically transparent material for producing high quality images comprising multiples of such points. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention relates to methods in which laser energy is utilized to generate visible points or areas of damage inside of an object. Such points may be referred to as "etch" points. Preferably, the object comprises a transparent or substantially transparent object through which maybe viewed the created etch points. Such material may comprise glass or similar material.

Multiple of such etch points may be utilized to generate or produce a visible image. The quality of the image is enhanced by generating the points in variety of different shades. In general, these shades comprise a range of "gray" shades between and including white and black.

To provide a better understanding of the essence of the method of the present invention it is expedient first to consider the breakdown process and general dynamical phenomena which are attendant to it. Laser-induced damage occurs when the laser irradiance exceeds a certain threshold energy value which is characteristic of the material. When the threshold energy value is exceeded, a plasma condition is generated in a laser beam focal spot. The generation of the plasma is associated with a shock wave which causes a cleavage in the glass or other transparent material.

The process of laser-induced damage development has several stages:

1) creation of an initial low-density free electron concentration;

2) buildup of this electron concentration until a density of $10^{18}$ to $10^{19}$ cm$^{-3}$ is reached;

3) absorption of the remainder of the laser pulse by the resulting plasma;

4) an increase in temperature to a value of several thousands of degrees;

5) the generation of an initial thermally-induced sound wave which is the response of the medium following the thermal expansion of the central region during the laser heating pulse, which sound wave propagates outward;

6) the expansion of created liquid at a rate much slower than the speed of sound;

7) the generation of a pressure-induced sound wave as the liquid forms higher pressure with a gradients of the order of several GPa/$\mu$m; and 8) the formation of cracks at the liquid/solid interface (velocities in the range of 1 to 2 km/s).

It is important to note that there are two predominant types of cracks which are generated. One type is the largest and longest on average. These cracks have a relatively independent orientation. Another type is a large number of very fine shorter "hair-like" cracks which are relatively isotropic in distribution. In the beginning of the process, cracks of first type are generated. Once these cracks have been made, the remaining pressure is relieved by a large number of relatively small cracks. All this process continues several tens of nanoseconds. The plasma condition exists much longer, however, sometimes about one millisecond.

A method of the present invention is based on the use of a laser pulse with energy which exceeds the energy threshold $E_0$ by a negligible amount or level (i.e. an amount just necessary to effect breakdown in the material), and the generation of a point of damage having a particular brightness by controlling the duration of the pulse. In general, by increasing the duration of the pulse, the brightness of the resulting point is increased.

Other embodiments of the invention comprise a method which is based on the use of a laser pulse with a specific form so that plasma is generated at the beginning of a pulse, and thereafter is only supported or maintained. An example of a kind of such a method of delivering packets or rations or energy is shown in FIG. 1. In this figure, time $t_1$ is a time when laser radiation begins to interact with a material, $t_2$ is a time when plasma has been created, and $t_3$ is a time when the interaction is finished. In this arrangement it is possible to generate plasma with a reduced amount of energy, and with the energy necessary for creation of the desired laser-induced damage being delivered in subsequent packets/batches or rations which are delivered to maintain the plasma state. Packet, batch, ration, portion and similar terms as used herein are meant to refer to quantities of energy. Such energy may be delivered in the form of a laser pulse. However, as described below, a single laser pulse may be divided into a number of energy packets which are delivered to a material. Thus, the terms packet and the like are used to make reference to the fact that the energy delivered need not comprise individual energy packets from a laser.

Other embodiments of the invention comprise a method which is based on control of laser radiation development during the breakdown process. The principal concept of this method is to generate a plasma condition or state with a first laser energy packet, and thereafter maintain that condition with small portions of laser energy until or while the shocked stress induced by the previously applied energy dissipates. The method permits control over the plasma evolution so as to decrease the initial thermal-induced sound wave and the pressure induced by the liquid. In this method, the cracks which are generated are not very large and not very long as compared to the methods of the prior art. Additional cracks induced by the following portions of the laser energy are generally smaller because the energy for maintaining the plasma is lower than the energy which is initially applied to create the plasma state. These additional cracks are substantially small "hair-like" cracks which are relatively isotropic in distribution. This process is illustrated in FIG. 2.

Figure 2:
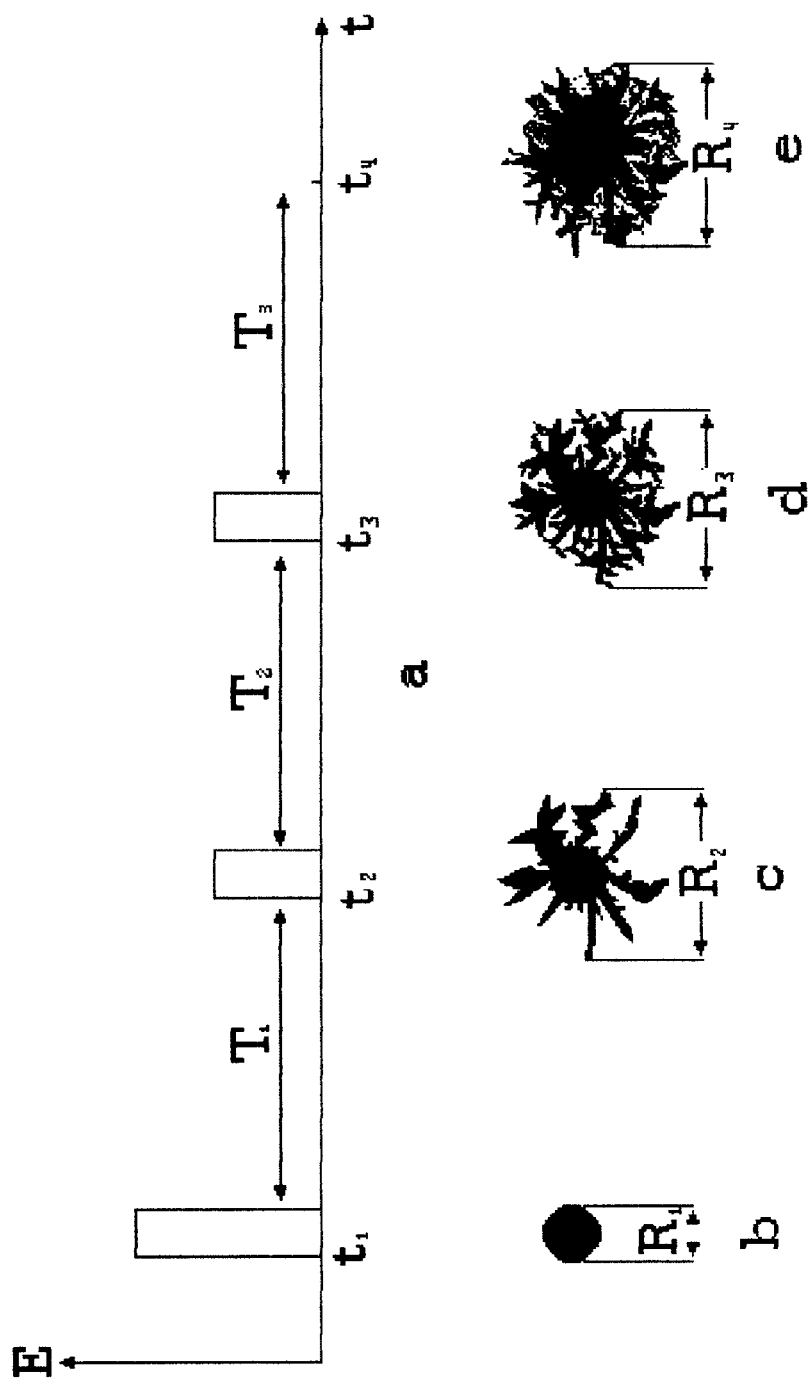
FIGS. 2(a)–(e) show a laser energy packet series and associated development of damage in a transparent material induced by the energy packet or ration sequence of a $TEM_{00}$ laser beam, with (a) showing an energy packet series, wherein E comprises a laser energy, $t_1$, $t_2$, $t_3$ are points of time when a laser beam interacts with a transparent material; (b) shows a focal spot of a $TEM_{00}$ laser beam; (c) shows a laser induced damage at $t_2$ point of time; (d) shows the laser induced damage at $t_3$ point of time; and (e) shows a laser induced damage inside a transparent material after $t_4$, where $R_1$ is a focal spot size, and $R_2$, $R_3$, $R_N$ are sizes of the laser induced damages.

FIG. 2, three (3) images of laser induced damage (c, d, f) are shown, with such obtained (respectively from left to right) at times $t_2$, $t_3$, $t_4$ Time $T_1$ between the first and the second laser packets is equal to that time during which most or much of the morphological dynamics induced by the first packet is completed. For example, if the pulse duration is 15 ns, in some kinds of crystals and other materials, much of the morphological dynamics occurs during the first 50 ns.

A method of generating a laser-induced damage point or area in accordance with this embodiment of the invention is as follows:

Step 1: a main energy level $E_1$ of a laser pulse which exceeds an energy threshold $E_0$ necessary to create plasma in the material is determined;

Step 2: the time T1 during of which much of the morphological dynamics of damage creation induced by the first laser pulse has finished is determined;

Step 3: a number of laser energy packets "n" needed for creation of laser induced damage of a desired brightness is determined;

Step 4: adequate energy levels $E_2$, . . . $E_n$ of following laser energy packets to maintain the plasma state and times $T_2$ . . . $T_n$ during of which much of the morphological dynamics of a damage creation induced by the previous laser pulse has finished are determined; and Step 5: energy packets of laser radiation with parameters determined in Steps 1–4 are generated and focused inside a transparent material.

Other embodiments of the invention comprise a method and system for producing etch points by controlling the spacial structure or form of a laser beam. In the prior art, a laser beam is focused in a small focal spot and all of its energy is directed inside the focal spot compactly (gaussoid). The focal spot is smaller in size than the size of the desired resulting damage area to be produced. For example, TEM$_{00}$ laser radiation is usually focused in a spot about 10 $\mu$m–20 $\mu$m when the desired damage size is about 100 $\mu$m–200 $\mu$m. Generating an etch point of a desired size is achieved by adjusting the level of the laser energy delivered in the same pulse duration. As a result, the area at which the laser energy is directed is essentially smaller than the desired size of the damage area, but the energy applied is much greater than the threshold energy necessary to effect a breakdown. In this arrangement, large cracks (a star pattern) are generated.

In accordance with the present invention, a smaller level of energy (slightly larger than the energy required to effect a breakdown) than that delivered in the prior art is applied to the material. However, the laser radiation is applied over a large focal area, the focal area being larger than the normal focal area but less than the area of the desired damage. The same total energy is generally applied to generate the damage, but the energy is directed over a larger area (i.e. a lower energy density) and thus the cracks which are generated therefrom are much smaller. Correlation between energy level and the area over which the energy is applied is selected so that the resulting cracks all stay within the desired damage area. To achieve this effect, special focal optics are used or the laser radiation is provided with many transverse modes $TEM_{mn}$, where the integers $m<m_0$ and $n<n_0$ and $m_0$ and $n_0$ are such that the focused energy is inside the desired resulting damage area.

Figure 3:
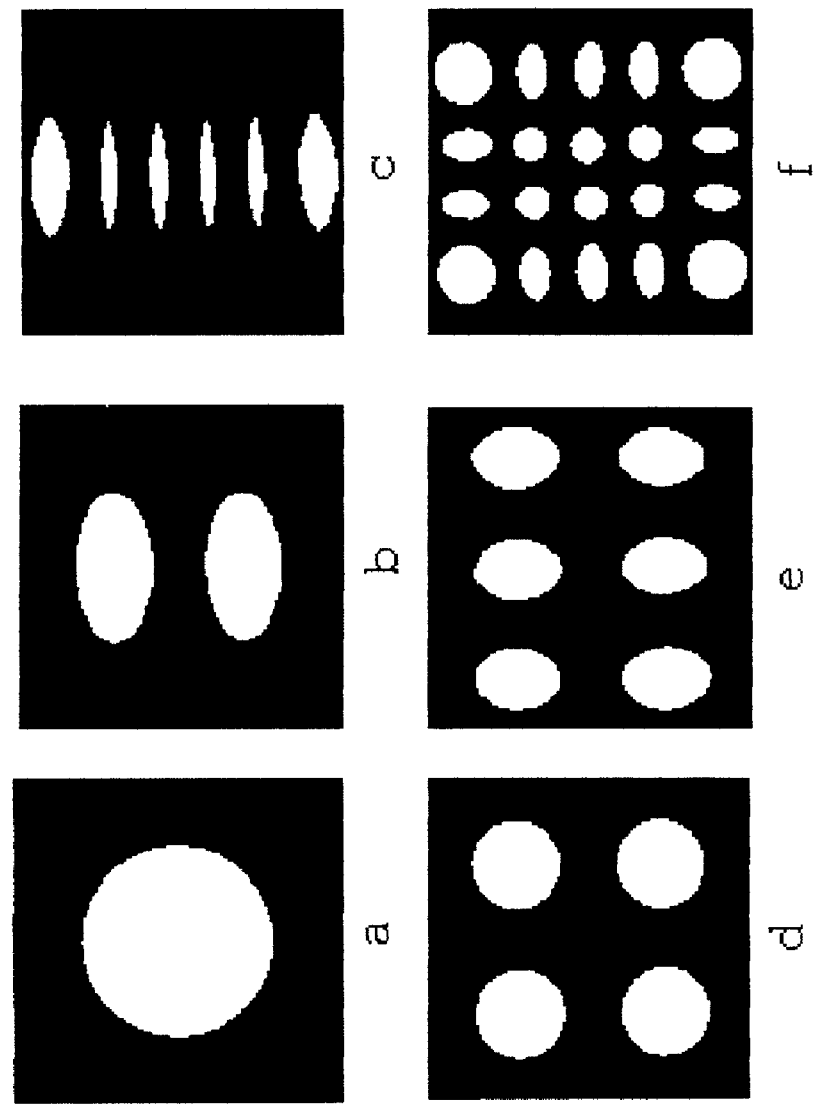
FIG. 3(a)–(f) show near-field radiation mode patterns of a laser: (a)-$TEM_{00}$, (b)-$TEM_{10}$, (c)-$TEM_{50}$, (d)-$TEM_{11}$, (e)-$TEM_{12}$, (f)-$TEM_{55}$.

Other embodiments of the invention comprise generating a laser beam having a right transverse mode to form an image of a laser output at a focal spot. To provide a better understanding of the essence of this method it is expedient first to consider a schematic diagram of different transverse laser modes as shown in FIG. 3. A $TEM_{mn}$ beam (rectangular cavity resonator) has $(m+1)(n+1)$ perpendicular maxima (mn and n in each direction), dividing the beam into mn quadrants. In FIG. 3(a), the $TEM_{00}$ beam 3(a)) has 1 peak, in FIG. 3(b) 2 peaks, and so on. The to corresponding pictures can be formed in a focal spot. Consequently, a cross-section profile of laser radiation can also have $(m+1)(n+1)$ peaks in the focal spot.

In accordance with the invention, if the energy in these focal peaks exceeds the energy threshold for the material, then breakdowns occur in the localities corresponding to the peaks. If the distance between adjacent peaks is larger than a distance threshold $d_0$ at which breakdown in the material occurs (i.e. and internal breakdown or cracking) then separate small laser induced damage points are generated inside a focal spot. A viewer sees these separate areas of damage as an integrated or single area of damage if the distance threshold $d_0$ is not very large. It will be appreciated that the value $d_0$ is a minimum value if the energy of the peaks is approximately equal to the energy threshold. The brightness of the integrated damage area is higher when an energy of peaks inside the focal spot is larger and when a number of separate peaks is larger. If the distance between adjacent peaks is smaller than the distance threshold $d_0$ then cracks induced by separate peaks intersect. In both cases, however, when the peak areas are smaller than the focal spot, the laser-induced damage has shorter cracks. This effect is more effective when a distance between adjacent peaks is closer to $d_0$. This process of laser damage creation is illustrated by FIG. 4.

Figure 4:
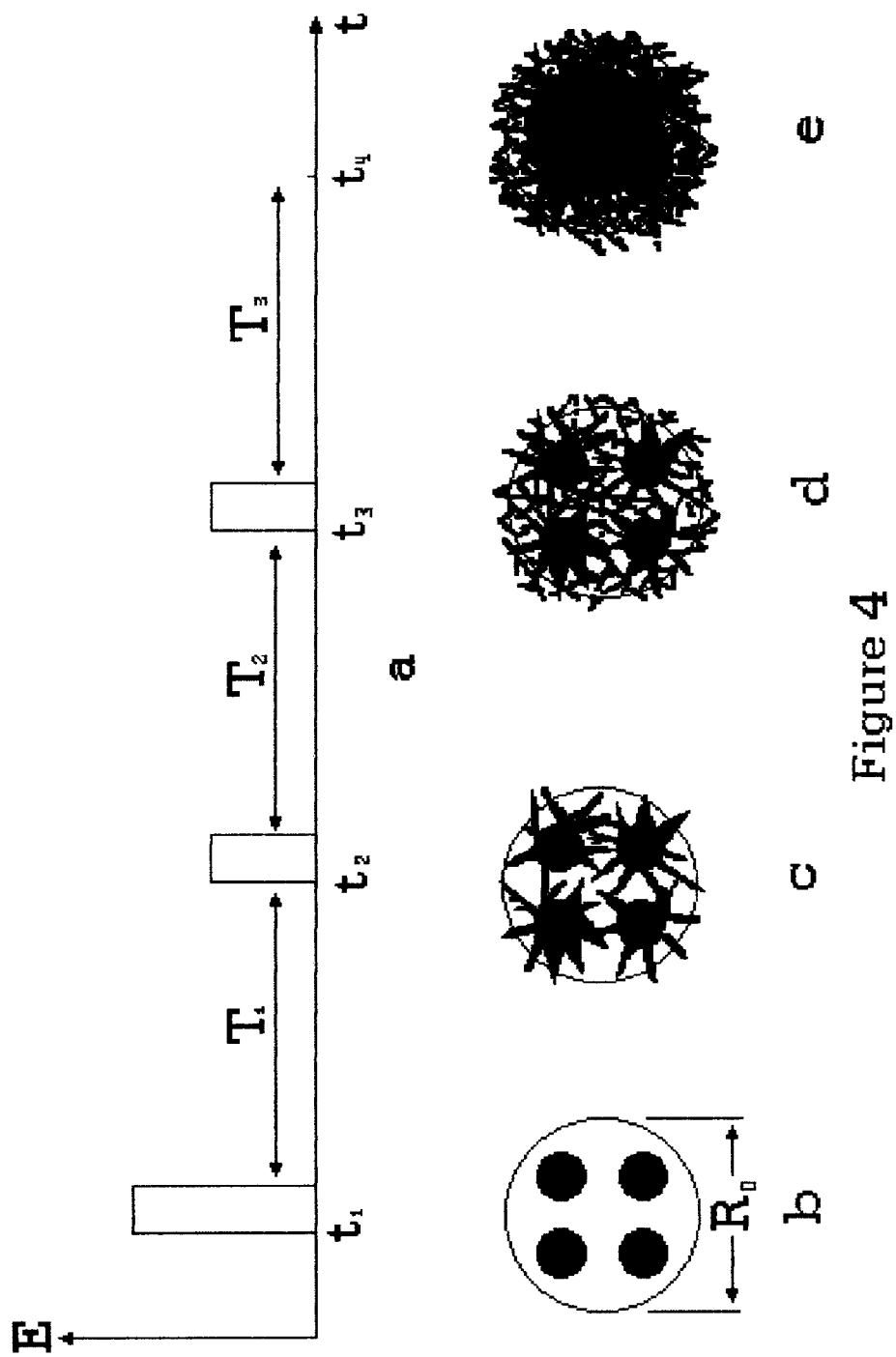
FIG. 4(a)–(e) show a laser energy packet or ration series and a development of a damage in a transparent material induced by the pulse sequence of a $TEM_{11}$ laser beam with (a) showing an energy packet series, wherein E is a laser energy, $t_1$, $t_2$, $t_3$ are points of time when a laser beam interacts with a transparent material; (b) shows a spot where a laser beam $TEM_{11}$ is focused at $t_1$ point of time; (c) shows a laser induced damage at $t_2$ point of time; (d) shows a laser induced damage at $t_2$ point of time; and (e) shows a laser induced damage inside a transparent material after $t_4$.

FIG. 4(b) illustrates an exigible laser induced damage with four peaks corresponding to laser radiation of $TEM_{11}$, FIGS. 4(c, d, f) show images of three (3) points of induced damage obtained (respectively from left to right) at times $t_2$, $t_3$, $t_4$ using pulses timed as illustrated in FIG. 4(a).

A method of generating an laser-induced damage in accordance with this embodiment of the invention is as follows:

Step 1: an effective size $R_0$ of a laser-induced damage point or area for reproduction of a particular brightness and gray shade for the point is determined;

Step 2: an effective size $r_0$ of laser-induced damage for radiation of $TEM_{00}$ with an energy equal to the threshold is determined;

Step 3: a distance threshold do for spots induced by a radiation of $TEM_{00}$ with energy equal to the threshold is determined;

Step 4: integers m and n of the right transverse mode $TEM_{mn}$ are determined so that the peaks cover the entire damage area $R_0$ and the distance between adjacent peaks is approximately equal to $d_0$.

The methods of the present invention have a number of advantages. Among these include:

1. the ability to create laser-induced damage points or areas not having a star structure;

2. the ability to change the brightness of laser-induced damage areas or points without changing the size of the points; and 3. the ability to reproduce gray shades having a wide-range of shades.

An advantage of avoiding the star structure is, as stated above, in providing more controlled points of size and brightness. An advantage of providing points of varying brightnesses or shades of gray but having the same size is that the points can be accurately located to produce an image. As will be appreciated, the quality of an image is substantially degraded if in those areas where a particular shade of points is necessary, the points must be located much farther apart because they must be made larger to reproduce the desired brightness.

The desired energy packets or rations can be delivered to the plasma from a laser specially configured to provide energy in particular amounts at particular times, or a regular laser can be adapted to produce the same effect. Described below is a system in which a regular laser pulse is utilized to generate the desired energy packets.

Other embodiments of the invention comprise a system for producing an etch point by control of breakdown process development and use of a specific space structure of a laser beam. Reference is now made to FIG. 5, which illustrates in block-diagram form a laser etching system which may be used to produce high quality laser-induced damage images by controlling plasma process development.

Once emitted from the laser 1 the pulsed beam $b_1$ is directed to a beamsplitter 2, which divides the laser beam into two separate beams $b_2$ and $b_4$. The beam $b_2$ is directed to a beamsplitter 3, which divides the beam $b_2$ into two separate beams $b_3$ and $b_5$. The beam $b_3$ is directed to an optical system 10 which forms a pattern of the laser output in its focus inside an article. The beam $b_4$ is reflected by a mirror 4 toward a time-delay line 8. A transfer mirror 5 directs the beam $b_4$ to a beamsplitter 3, which divides the beam $b_4$ into two separate beams $b_6$ and $b_7$. The beam $b_6$ is directed into an optical system which forms a pattern of the laser output in its focus inside an article. The beam $b_5$ is directed to a mirror 6 which directs it to a time-delay line 9. The mirror 7 directs it to the beamsplitter 2, which divides it into two beams $b_8$ and $b_9$ and so on. A shutter 15 is used to control the number of laser pulses which reach the article. A computer 11 controls the laser 1, a moving table 14 (for adjusting the position of the object, and thus the focal point of the beam(s)), and the shutter 15.

The arrangement so described is useful in generating laser pulses as illustrated in FIG. 5: a first main pulse at time $t_1$, and then subsequent pulses having lower energy values at spaced apart times $t_2$ and $t_3$. Such an arrangement is useful in generating a laser-induced damage point as described and illustrated in FIG. 2, wherein multiple energy pulses which are spaced apart at certain times and which have different energy values are utilized.

In one or more embodiments, a method of producing etch points comprises the following steps:

Step 1: generating a main laser beam having a main energy level which exceeds the energy threshold for effecting a breakdown of the material;

Step 2: dividing the main laser beam into two separate second and fourth beams, the second beam having an energy level sufficiently high to cause damage in the material and the fourth beam having an energy level sufficiently high to support a plasma condition;

Step 3: dividing the second laser beam into two separate third and fifth beams, the third beam having an energy level sufficiently high to cause damage in the material and the fifth beam having an energy level sufficiently high to support a plasma condition;

Step 4: directing the third beam into an optical system which forms a pattern of the laser output at a focus area inside the material;

Step 5: directing the fourth beam to a time-delay line or mechanism;

Step 6: dividing the fourth beam into two separate sixth and seventh beams, each of these beams having an energy level sufficiently high to support a plasma condition in the material;

Step 7: directing the sixth beam into an optical system which forms a pattern of the laser output at a focus area inside the material;

Step 8: directing the fifth beam to a time-delay line or mechanism;

Step 9: dividing the fifth beam into two separate eighth and ninth beams, each of these beams having an energy level sufficiently high to support a plasma condition in the material;

Step 10: dividing the eighth beam into two separate eleventh and twelfth beams, each of these beams having an energy level sufficiently high to support a plasma condition in the material; and Step 11: directing the twelfth beam into an optical system which forms a pattern of the laser output at a focus area inside the material.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A method for generating a point of laser-induced damage in a material by controlling breakdown process development of damage areas comprising:

generating laser radiation having sufficient energy to induce a plasma condition at a point in said material; and directing said laser radiation at said point to generate said plasma condition and thereafter maintain said condition until sufficient total energy has been delivered to said material so that a resultant damage area of the desired size will be created in said material.

2. The method in accordance with claim 1 wherein said laser radiation comprises a single pulse of laser energy, said energy exceeding an energy threshold for effecting a breakdown of the material by a negligible amount and wherein the size of the area of damage is controlled by changing the time of the pulse duration.

3. The method in accordance with claim 1 wherein said laser radiation comprises a laser pulse with a specific form so that said plasma condition is generated at the beginning of the pulse and is thereafter only maintained.

4. The method in accordance with claim 1 including the step of controlling a life of said plasma condition with said laser radiation to generate an area of damage having a desired brightness and size.

5. The method in accordance with claim 1 including generating said plasma condition with at least a first energy packet of laser radiation and thereafter maintaining said plasma condition with one or more second energy packets of laser radiation.

6. The method in accordance with claim 1 including the steps of applying a first portion of laser radiation to generate said plasma condition and applying at least one second portion of laser radiation to maintain said plasma condition, and waiting a period of time between said application of said first portion of laser energy and said at least one second portion of laser energy, said period of time comprising a time sufficient for the shocked stress induced by the first portion of energy to substantially dissipate.

7. The method in accordance with claim 1 including the steps of applying a first portion of laser radiation to generate said plasma condition and applying at least one second portion of laser radiation to maintain said plasma condition, and including the steps of determining a number of said second energy portions needed for creation of a point of laser induced damage having a desired brightness, determining an energy level for said second portions to support said plasma condition, and determining a period of time between said pulses during of which a substantial portion of the morphological dynamics of damage creation induced by the application of a previous portion of laser energy has occurred.

* * * * *